May 27, 1930.     S. P. SLATER     1,760,324
RAT TRAP
Filed March 19, 1928
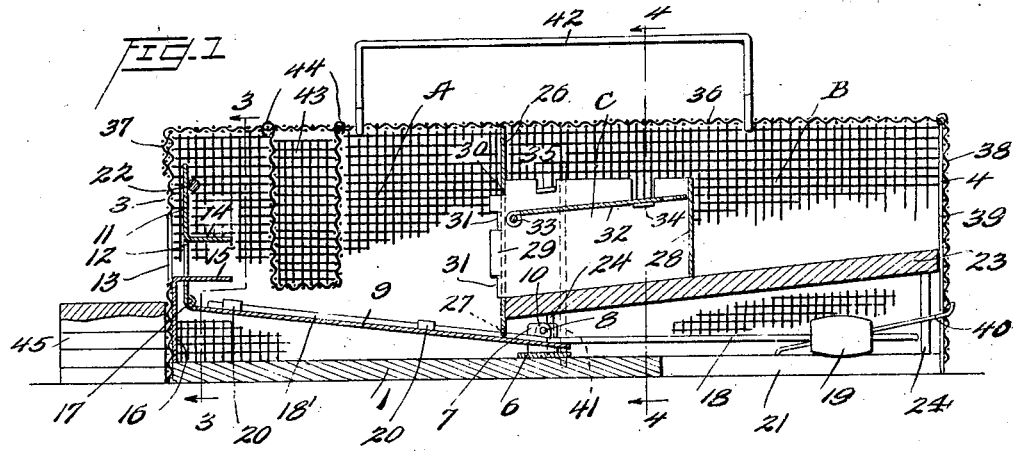
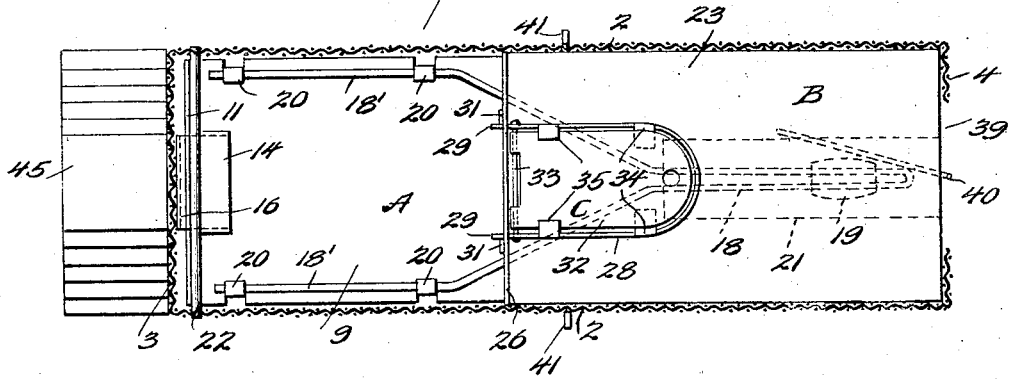
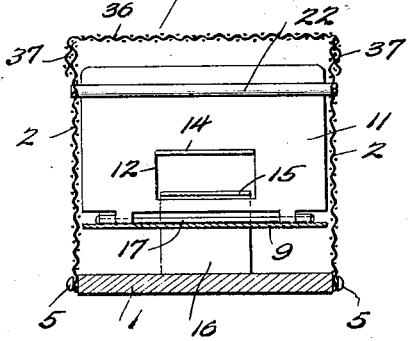
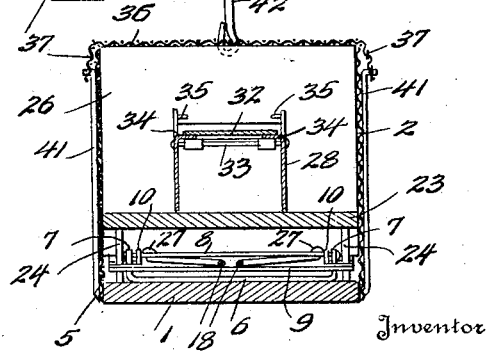

Patented May 27, 1930

1,760,324

UNITED STATES PATENT OFFICE

SAMUEL P. SLATER, OF ATLANTA, GEORGIA

RAT TRAP

Application filed March 19, 1928. Serial No. 262,883.

Generically, this invention relates to animal traps, but it is more especially directed to the type adaptable for catching rodents, and susceptible of being expeditiously located in any particular section of a house or building so infested.

One of the principal objects of this invention is the provision of a trap of this character having two chambers, each chamber provided with automatically operable means for preventing escape from said chamber.

Another important object of this invention is the provision of a trap of the above character having two communicating sections, means within the entrance section automatically operable by the animal for effecting closing of the entrance, said means automatically returning to open position when the animal has entered the second section, and trap means for preventing the escape of the animal from said second section.

A further object of this invention is the provision of a trap of this character having communicating sections, one section having a counter weighted bottom provided with means for automatically closing the entrance by the weight of the trapped animal, said bottom adapted to return to normal or elevated position effecting opening of the entrance when the animal has entered the second section and automatic means for preventing the escape of the animal from said latter section.

A further important object of this invention is the provision of a trap of this character provided with communicating sections, one having a counter weighted hinged bottom adjacent the entrance, said section automatically effecting closing of the entrance when the animal to be caught has entered said trap. A floor portion provided with a partition wall and trap door means adapted when positioned to form a second chamber with its bottom elevated above the plane of the first chamber, a removable top section for the trap extending over both sections, detachable bait holding means adapted to be carried by said top section, and a hinged end section for effecting closure of the rear end of the trap, and means for securing said end and top sections to the trap.

With these and other objects in view, which will become apparent as the description proceeds, the invention resides in the construction, hereinafter more fully described and claimed, and illustrated in the accompanying drawings, in which like characters of reference indicate like parts throughout the several figures, of which:

Fig. 1 is a longitudinal sectional view of my improved trap;

Fig. 2 is a top plan view with the top section removed;

Fig. 3 is a vertical section on the line 3—3 of Fig. 1; and

Fig. 4 is a vertical section on the line 4—4 of Fig. 1.

The devices of this character with which I am familiar have proven deficient by reason of being limited to catching one animal at a time, or by virtue of their construction incapable of being readily cleaned, not susceptible of being automatically set at all times irrespective of the number of animals already in the trap, too expensive to manufacture, and for other reasons unsatisfactory, and it was to overcome such deficiencies and to provide a trap easily transportable, provided with detachable parts to effect expeditious cleaning, comprising means for automatically trapping each animal as it enters the trap, said means automatically returning to open position when the animal has entered another section of the trap, so that irrespective of the number of animals caught, the trap will always be operatively set, that I designed the device forming the subject matter of this invention.

In the illustrated embodiment characterizing this invention there is shown a trap formed with a solid bottom 1, and sides 2, and ends 3 and 4, respectively, preferably of wire netting or the like, suitably secured to the bottom section by staples or other suitable fastening elements 5. Secured to the bottom section substantially central thereof is a transverse strip 6 extending to points spaced from the sides 2 and terminating in upstanding lugs 7 perforated to receive a rod 8, for a purpose which will hereinafter more fully appear.

A platform 9, preferably constructed of sheet metal, and conforming substantially to the width of the bottom 1, is adapted to overlie said bottom and extend from the end 3 to a point rearwardly of rod 8, and is formed with struck up lugs 10, perforated to receive the rod 8 hingedly mounting said platform thereon. An end section 11 of sheet metal or the like is formed with a central opening 12 corresponding to the entrance opening 13 in the end portion 3, and is formed at its upper edge with an inwardly extending lateral lip 14 adapted to seat, when platform 9 is in lowered position, on the complemental stationary platform 15, formed on the upper end of the vertical member 16, suitably secured to the end of the bottom section 1. The end section 11 is hingedly secured to the movable platform 9 by rod 17, as will be well understood without further description.

An arm 18 is adapted to have mounted thereon a longitudinally adjustable counter weight 19, said arm being preferably formed from wire bent upon itself and diverging outwardly and in parallelism with the outer edges of the platform 9 terminating in fingers 18', secured thereto by struck up portions 20 crimped around said wire, said arm extending upwardly at an angle from the rear end of platform 9 so that its free end, when the platform is in lowered position, will be in a plane above that of said platform 9, but normally the counter weight 19 will be received by the cut out portion 21 in the bottom 1, which will cause platform 9 to be elevated at its front end, its upward movement being limited by platform 15 so that openings 12 and 13 will register, as will hereinafter more fully appear. In order to maintain the end portion 11 in upright position, the guide rod 22 is adapted to extend through and be suitably secured to the sides 2, slightly spaced from the end 3.

A bottom section 23 is adapted to extend from the rear end 4 to a point slightly beyond the rod 8 and be supported on standards 24, suitably secured in the bottom 1 adjacent rod 8, the upper ends of standards 24 being slightly above the lugs 10 so that the bottom will be inclined upwardly from said lugs towards the rear end 4.

A partition 26 preferably constructed of sheet metal or the like, is suitably secured to the inner end of the bottom of floor member 23, and is adapted to extend downwardly substantially flush with the hinged platform 9 and formed with cut-out portions 27 to receive the diverging fingers 18' of the arm 18.

A housing 28 preferably formed of sheet metal and adapted to be bent upon itself so that each of its ends 29 will extend within the opening 30 formed in the partition 26, and be suitably secured to opposite sides of the opening in the present instance by struck-up portions 31 alternately extending on the opposite sides of the partition.

It will thus be apparent that the partition 26 positioned substantially midway between the ends 3 and 4, respectively, forms an entrance section or chamber A and an upper section or chamber B, and that the housing 28 constitutes an auxiliary chamber C within the chamber B, said chamber C being normally closed at the top by a trap-door or a closure member 32 hingedly mounted on rod 33 extending through the ends of the housing adjacent the partition 26 at points spaced downwardly from the upper edges of the housing, the free end of said trap-door adapted to normally rest on the inwardly projecting struck-down lateral lugs 34, the said housing being provided with similar lugs 35 extending above said door to limit its upward movement. The trap door 32 is adapted to be elevated by the animal when within said chamber to permit its ingress into chamber B and to prevent its egress therefrom. In this connection it will be noted that the floor 23, partition 26, and housing 28, constitute a unitary structure easily removable for purposes of cleaning or the like.

A top closure 36 formed with end and side flanges 37 is adapted to extend over both chambers A and B and is formed with a hinged end gate 38 adapted to form a closure for the opening 39 in the end 4, so that the animals confined in chamber B may be released therefrom, the said gate being secured in closed position by spring catch 40 suitably secured to the bottom 1 of the trap. A catch rod member 41 is suitably secured to the bottom 1 on each side 2 substantially central of its length and extends upwardly having its free end bent outwardly to detachably engage the flange side 37 of the closure 36 to secure said closure in position. Said closure is provided with a handle 42 to effect means for easily transporting the trap, the said closure preferably being constructed of wire netting similar to sides 2. A bait receptacle 43, likewise preferably formed of wire netting and having outwardly extending lugs 44 formed on its upper edges is adapted to be detachably secured to closure 36 and suspended within the chamber A. In order to permit ready entrance into the trap, a platform 45 is suitably secured to bottom 1 adjacent opening 13, as will be clear without further description.

While it is thought the operation of the device will be clear from the above description, it might be well to state that when the animal enters the trap through opening 13, its weight will impel the platform 9 and end section 11 downwardly, thereby closing the entrance, and when the animal has entered the auxiliary chamber C, platform 9 and end 11 will return to their normal elevated position, thereby again setting the trap. The animal in its endeavor to escape from chamber C will elevate the trap-door 32, thereby permitting its ingress into chamber B, said trap-door returning to its normal position which will prevent its escape from said latter chamber. It is obvious, therefore, that the trap is not limited to one animal and is only limited by the capacity of chamber B.

From the above it will be apparent that I have designed a trap of the character described, so constructed that its component parts may be easily removed for cleaning and the like, simple in construction, manufactured at a negligible cost, and efficient for the purposes intended.

Although in practice I have found that the form of my invention illustrated in the accompanying drawings and referred to in the above description as the preferred embodiment, is the most efficient and practical; yet realizing the conditions concurrent with the adoption of my invention will necessarily vary, I desire to emphasize that various minor changes in details of construction, proportion and arrangements of parts, may be resorted to within the scope of the appended claim without departing from or sacrificing any of the principles of this invention.

Having thus described my invention what I desire protected by Letters Patent is as set forth in the following claim:

An animal trap comprising a housing open at the top, a partition separating the housing into front and rear trapping sections having entrance openings, a pivoted counterbalanced platform floor member for the front section, a closure for the entrance to said front section hingedly connected to the platform member and operable to closed position by the weight of the animal on said platform, an auxiliary rear bottom section supported in a plane above that of the said platform and having its front end connected to said partition, an auxiliary chamber within said rear section communicating with the entrance to the front section, a gravity actuated closure means for the top of said auxiliary chamber adapted to permit ingress into the rear section and prevent egress therefrom, said auxiliary rear bottom, auxilary chamber, and partition being connected and removable from said housing as a unit, and closure means for said housing.

SAMUEL P. SLATER.